United States Patent
Zhang et al.

(10) Patent No.: US 12,007,753 B2
(45) Date of Patent: Jun. 11, 2024

(54) SYSTEM AND METHOD FOR PREDICTING INDUSTRIAL EQUIPMENT MOTOR BEHAVIOR

(71) Applicant: One Tech, Inc., Dallas, TX (US)

(72) Inventors: Yandong Zhang, Plano, TX (US); Yasser Khan, Dallas, TX (US)

(73) Assignee: One Tech, Inc

( * ) Notice: Subject to any disclaimer, the term of this patent is extended or adjusted under 35 U.S.C. 154(b) by 0 days.

(21) Appl. No.: 16/442,250

(22) Filed: Jun. 14, 2019

(65) Prior Publication Data

US 2020/0393818 A1    Dec. 17, 2020

(51) Int. Cl.
| | |
|---|---|
| G05B 19/418 | (2006.01) |
| G05B 23/02 | (2006.01) |
| G06F 17/18 | (2006.01) |
| G06N 20/20 | (2019.01) |

(52) U.S. Cl.
CPC ..... *G05B 19/4184* (2013.01); *G05B 19/4183* (2013.01); *G05B 23/027* (2013.01); *G06F 17/18* (2013.01); *G06N 20/20* (2019.01); *G05B 23/0283* (2013.01)

(58) Field of Classification Search
CPC .............. G05B 19/4184; G05B 23/027; G05B 19/4183; G06N 20/20; G06F 17/18
USPC ....................................................... 700/108
See application file for complete search history.

(56) References Cited

U.S. PATENT DOCUMENTS

| | | |
|---|---|---|
| 5,963,884 A | 10/1999 | Billington et al. |
| 6,735,549 B2 | 5/2004 | Ridolfo |
| 7,895,047 B2 | 2/2011 | Wetzer et al. |
| 2018/0018587 A1* | 1/2018 | Kobayashi ............. G06N 20/00 |

FOREIGN PATENT DOCUMENTS

WO    2014043623 A1    3/2014

OTHER PUBLICATIONS

Amruthnath et al., "Fault Class Prediction in Unsupervised Learning using Model-Based Clustering Approach", 2008.
Cinar et al., "Machine Learning in Predictive Maintenance towards Sustainable Smart Manufacturing in Industry 4.0", MDPI, Sustainability 2020, 12, 8211, pp. 1-42.

* cited by examiner

*Primary Examiner* — Hien D Khuu (57) ABSTRACT

A computer implemented method and system for predicting motor failure. The system and method employ artificial intelligence to train machine learning models to predict failure mechanisms within a machine. The system features at least one database configured to store machine performance indicator data. At least one server is configured to receive the indicator data and train machine learning models which are used by a processor to predict motor failure. The method for predicting motor failure is iterative, allowing the machine learning model to become more skilled at predicting machine performance outcomes in real-time.

12 Claims, 5 Drawing Sheets

| 1 | 2 | 3 | 4 | 5 | 6 | 7 | 8 | ... | 1197 | 1198 | 1199 | 1200 | 1201 |
|---|---|---|---|---|---|---|---|---|---|---|---|---|---|
| I (1) | V (1) | TEMP1 (1) | TEMP2 (1) | I (2) | V (2) | TEMP1 (2) | TEMP2 (2) | | I (300) | V (300) | TEMP1 (300) | TEMP2 (300) | X LABEL |

SYSTEM AND METHOD FOR PREDICTING INDUSTRIAL EQUIPMENT MOTOR BEHAVIOR

BACKGROUND

Motors that drive machines form the core of many machines. This can be a single motor or multiple motors that together function to drive the machine. Should one or more of the motors fail, the machine that the motor is driving will also fail. Motors, however, do not often fail abruptly. There are often indicators that precede the failure of the motor. Monitoring these indicators allows prediction of when a motor might fail and allows corrective action such as repair or replacement of the motor prior to actual failure. Catastrophic failure of the machine that the motor (or motors) is driving can therefore be prevented.

In complex modern machines, there area large number of motors in any one individual machine. Furthermore, in a modern industrial environment, such as a technically sophisticated semiconductor manufacturing facility, there are multiple machines that may each contain a large number of motors. These motors can be large or small motors. The indicators that precede motor failure for each motor can be monitored to predict whether motor failure will occur. Although devices and methods have been deployed to monitor indicators that may indicate motor failure, these devices and techniques have not been very effective in generating an accurate prediction. Accurate prediction is important for multiple reasons. The first reason is that if motor failure is not predicted before the motor actually fails, the failure of the motor can lead to failure of the machine that the motor drives. However, the reverse problem with inaccurate motor failure prediction is that a motor with significant operational life remaining is replaced too early, leading to waste and increased maintenance costs. In motor maintenance within the actual operational environment of the motor, there are often no capabilities to do a full tear down of the motor to confirm that motor failure is truly imminent. As such, a more accurate system and method applied to monitoring and predicting motor failure is necessary.

Machine learning has become very important. Machine learning is generally defined by experts in the field as the science of getting computers to learn and act like humans do, and to improve their learning over time in autonomous fashion by feeding them data and information in the form of observations and real-world interactions. Understood differently, the goal of machine learning is to have computers generate new algorithms by themselves based on the interpretation of data rather than performing tasks based solely on rule based programming (i.e., performing a specific set of pre-programmed instructions). There are various merits to having computers, especially the low-powered, low-energy devices connected in a distributed manner in large numbers in an Internet of Things (IoT) network which generate new algorithms based on data they collect.

More specifically, in IoT, machine learning has already been successfully deployed to train a large number of low-powered, low energy devices. The primary machine learning model in IoT is that deployed to IoT networks featuring a server device and edge devices. Generally, the server device is a high-powered, high computational capability device, whereas the edge devices are low-powered, low energy devices with lower computational capability as compared to the server. The machine learning algorithm is deployed on the server device where the machine learning model is trained through the ingestion and processing of data. Once the training of the machine learning model is complete on the server side, the model is deployed to edge devices. After deployment of the machine learning model to the edge devices, no further changes are made to the machine learning model itself in the edge devices even though the edge device continues to gather copious amounts of data. This is commonly known as the train-freeze-deploy model.

There are numerous challenges that have emerged in applying a train-freeze-deploy model of machine learning for IoT for use in industrial motor failure prediction. In IoT for industrial motor failure prediction, IoT is a deployed as a large network of low-powered, low energy devices attached to various locations in a large industrial equipment or networks of industrial equipment that provide indications of potential motor failure. The IoT edge devices can be positioned in a large number of points of the industrial equipment to monitor and interact within those points of the industrial equipment to detect whether those points are functioning as designed and whether a motor will experience imminent failure. In this application, there can be several new challenges not found in more basic IoT networks. First, the operating data of industrial equipment can be very expensive to obtain such that prior to deployment an accurate failure prediction model can be generated or trained. Second, the variation between each motor within the industrial equipment can be very large. These variations are not taken into account in a machine learning model that only uses historical data for training. Third, the operating environment of the industrial equipment or industrial equipment network can experience quite a bit of variation from one point in time to another point in time. Thus, many industrial motors are not well suited for the train-freeze-deploy approach and a more intelligent system is required.

For the foregoing reasons, there is a need for a system and method for motor failure prediction using machine learning. The system and method disclosed herein solve problems encountered with machine failure prediction.

SUMMARY

The present disclosure relates to a computer implemented method and system directed to predicting motor failure. The system and method employ artificial intelligence to train machine learning models to predict failure mechanisms within a machine. The system may use a server to train machine learning models to predict machine failure, using performance indicator data. The system may deploy the trained machine learning models onto a one board computer (processor) where the models use operation data to predict motor failure. The models can be further trained using the operation data and continue to improve their machine failure prediction methods as a result of their evolutionary training.

An embodiment of the present disclosure is directed to a system for machine failure prediction. The system may comprise at least one database configured to perform operations to receive indicator data, arrange indicator data, and store indicator data. The system may also comprise at least one server configured to perform operations to receive the indicator data from the at least one database, train a plurality of machine learning models using the indicator data. The system may also comprise at least one sensor configured to receive operation data from a motor, and may store the operation data in a memory module. The system may also comprise at least one processor configured to perform the operations to receive the operation data from the memory module, receive the plurality of machine learning models configured to predict the possibility of equipment failure, and execute the plurality of machine learning models using the operation data.

In this embodiment, the plurality of machine learning models can be further trained using an evolutionary machine learning model, wherein the processor is configured to perform the following operations receive the operation data from the memory module: and train the plurality of machine learning models using the operation data. The operation data may be collected over a pre-determined time period wherein the predetermined time period is at least one month. The indicator data for training may be sourced from stand-alone data or factory data, cloud data, or a hybrid of factory data combined with stand-alone data. The operation data may be either temperature data, voltage data, current data, or vibration data. The stand-alone data may be actual indicator data collected from a motor in the field collected for at least one month. The processor may be wirelessly connected to a PC and the PC may use an application to monitor the operation data and failure predictions. The processor may also be wirelessly connected to a smart phone and the smart phone may use an application to monitor the indicator data and failure predictions. The processor may also be configured to generate an urgent alert signal where the urgent alert signal is triggered if the probability of machine failure is larger than 80%.

Another embodiment of the present disclosure is directed to a computer implemented method for predicting an indicator data value for a motor. The method may comprise defining a data collection time period, defining an initial period of the data collection time period as zero, initializing an input vector for the defined initial period, inserting stored indicator data as initial values for the defined initial period, predicting the indicator data value at the current time, outputting the predicted indicator data value, calling the input vector at the current time, inputting the input vector into a machine learning model, and predicting the indicator data value for at least a unit time stamp ahead of the current time. In the method, where the indicator data value is the temperature of the motor, the method may be repeated to yield a range of indicator data values that is a range of temperature values for the motor.

Another embodiment of the present disclosure is directed to a computer implemented method for predicting the behavior of a motor. The method may comprise using a multiple predictive machine learning model comprising the steps of calculating a percentage of input values that are correct, removing, at random, a number of input values corresponding to the percent that are incorrect, calculating a mean square prediction error value from the remaining input data values, calculating a weight of each of a plurality of single predictive machine learning models, determining the upper bound and lower bound of the input values, calculating a counter value for each single machine learning model, updating the weight of each single machine predictive learning, calculating a normal probability, updating the upper bound and lower bound of the input values, updating the normal probability based on the upper bound and lower bound of the input values, and calculating the probability of operational outcomes of the motor.

In the method, the weight is the weighted average contribution of each single predictive machine learning model to the total multiple predictive machine learning model. The weight of each single predictive machine learning model may be updated in every time stamp period. The method may be used to predict thermal runaway and generate a range of temperature range predictions and the computer may generate an urgent alert signal if thermal runaway is predicted.

The novel features and construction of the present invention, as well as additional objects thereof, will be understood more fully from the following description when read in connection with the accompanying drawings.

BRIEF DESCRIPTION OF THE DRAWINGS

These and other features, aspects, and advantages of the present disclosure will become better understood with regard to the following description, appended claims, and accompanying drawings where:

DESCRIPTION OF THE PREFERRED EMBODIMENTS

Figure 1A:
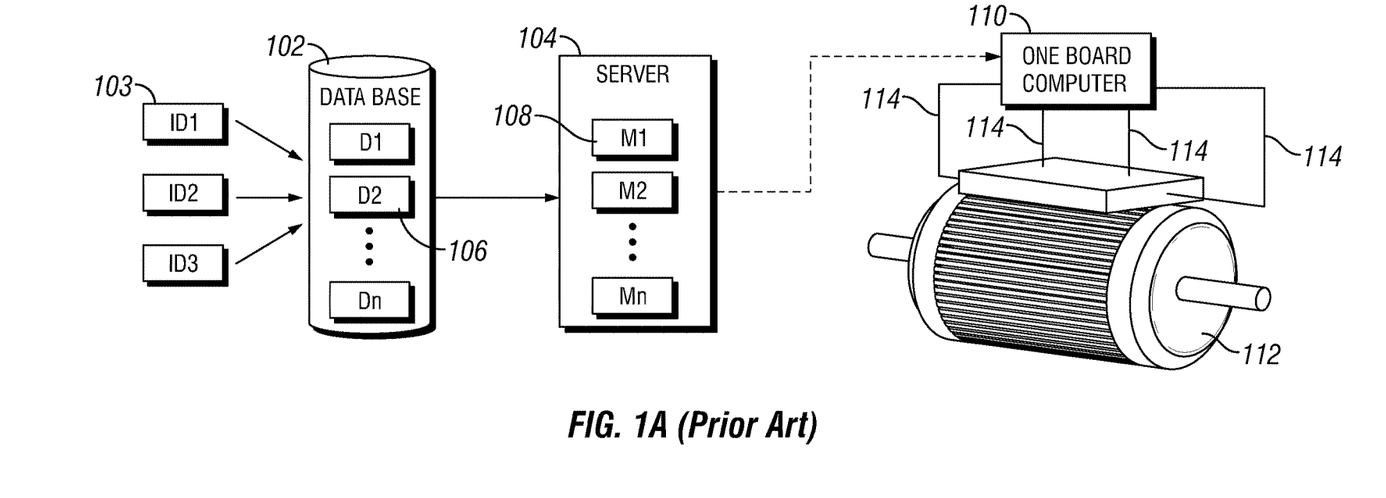
FIG. 1A is a block diagram illustrating a prior art train-freeze-deploy machine learning model for motor failure prediction.

FIG. 1A is a block diagram illustrating a prior art train-freeze-deploy machine learning model for motor failure prediction. Indicator data 103 is collected that can be used in a model far predicting motor failure prediction. These indicator data sets are collected from historical data during the operation of a motor type for which a machine learning model of motor failure prediction is to be developed. In one example, the indicator data 103 is internal temperature of the motor (ID1), voltage of the motor (ID2), and vibration of the motor (ID3). The collected indicator data 103 is stored in a database 102. The indicator data is stored as data 106. When aggregation of the data 106 is complete, the data 106 is transferred to a server 104. The server 104 trains machine learning models 108 (M1, M2. . . Mn) using the data 106. The machine learning models are designed for failure prediction, which predict the possibility of equipment failure in the next T days for different failure types.

A one board computer 110, otherwise known as a computer built on a single main circuit board, that hosts the machine learning models 108 is connected to a motor 112. The one board computer 110 has a variety of sensors (not shown) mounted on it. The sensors are connected to the motor 112 through connections 114. Upon completion of the training of the machine learning models 108, the machine learning models 108 are deployed to the one board computer 110. The one board computer 110 starts to run the deployed machine learning models 108 as the mounted sensors receive data of the motor's 112 operations through the connections 114. The machine learning models 108, reading the data from the motor 112, begin to generate real-time predictions as to whether the motor 112 will fail. Even as more data is received from the motor 112, the machine learning models 108 remained unchanged.

Figure 1B:
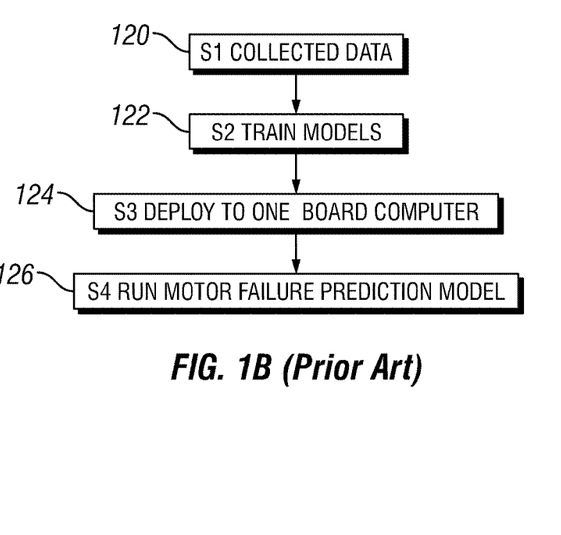
FIG. 1B is a flow chart illustrating the prior art train-freeze-deploy machine learning model for the machine learning model for the motor failure prediction of FIG. 1A.

FIG. 1B is a flow chart illustrating the prior art train-freeze-deploy machine learning model for the motor failure prediction of FIG. 1A. In the train-freeze-deploy machine learning model, in step S1 120, data is first collected and stored in the database 102. This is followed by step S2 122 where the data is used to train machine learning models 108 in the server 104. The machine learning models 108 are fixed after their training in the server 104. In step S3 124, the models are deployed to the one board computer 110. In step S4 126, the one board computer 110 begins to run the machine learning models deployed on it to predict the probability of the failure of motor 112.

Figure 2:
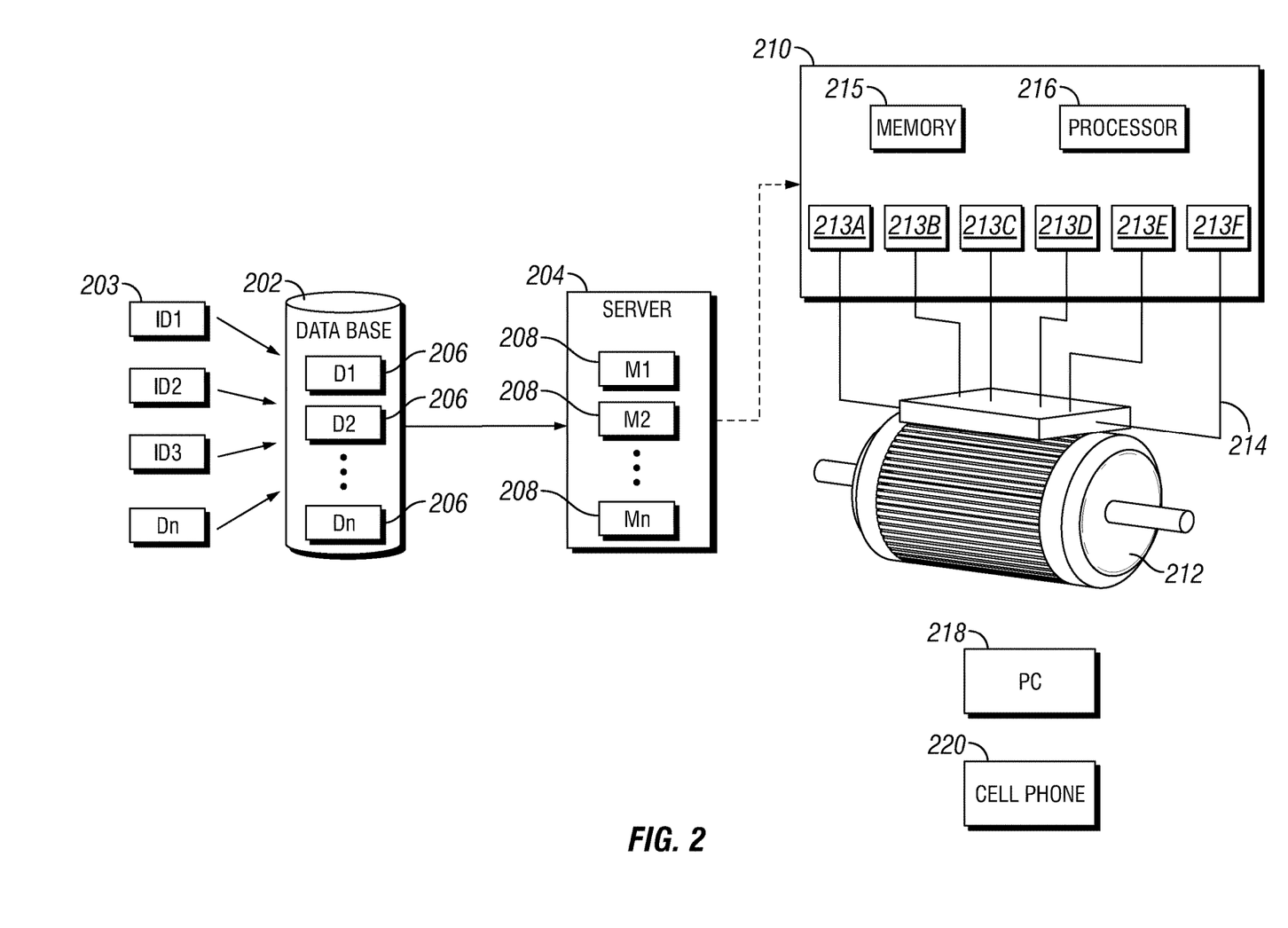
FIG. 2 is a block diagram illustrating one embodiment of a system and method for motor failure prediction using machine learning.

FIG. 2 is a block diagram illustrating one embodiment of a system and method for motor failure prediction using machine learning. Indicator data 203 may be used in a model for predicting motor failure prediction. In one example, the indicator data 203 may be internal temperature of the motor (ID1), voltage of the motor (ID2), and vibration of the motor (ID3). The collected indicator data 203 may be arranged and stored in a database 202. The indicator data is stored as data 206. When aggregation of the data 206 is complete, the data 206 may be transferred to a server 204. The server 204 may train machine learning models 208 (M1, M2. . . Mn) using the data 206. The machine learning models may be designed to predict the possibility of equipment failure.

A one board computer 210 that hosts the machine learning models 208 may be connected to a motor 212. The one board computer 210 may have a variety of sensors 213 mounted on it. The sensors may be connected to the motor 212 through connections 214. Prior to deployment, an initial set of machine learning models 208 may be trained on the server 204. Upon completion of the training of the initial machine learning models 208, the machine learning models 208 may be deployed to the one board computer 210. The one board computer 210 may have a processor 216 where the machine learning models 208 are deployed. The processor 216 may start to run the deployed machine learning models 208 as the mounted sensors 213 receive data of the motor's 212 operations through the connections 214. The machine learning models 208 may run the data from the motor 212 in the machine learning model 208 to generate real-time predictions as to whether the motor 212 will fail.

The one board computer may have a variety of sensors 213 mounted on it. The different sensors 213 may be mounted on a one board computer 210. An ambient air temperature sensor 213a may be mounted on the one board computer 210. An internal air temperature sensor 213b may be a thermistor with long wires extending to the motor 212 for measuring the internal air temperature in the motor 212. The temperature sensor 213b may have long wires that extend from the one board computer 210 to the internal chamber of the motor 212. A hall current sensor 213c may be mounted on the one board computer 210. An example of a hall current sensor that can be used is a ACS 1782. A voltage sensor 213d may be mounted on the one board computer 210. An example of a voltage sensor that can be used is a TPS3805H33. A vibration sensor 213e may be mounted on the one board computer 210. A humidity sensor 213f may be mounted on the one board computer 210. An example of a humidity sensor that can be used is a HOC 1080.

The sensors 213 may measure data from the motor 212 over time and store the data in a memory module 215 mounted on the one board computer 210. The ambient air temperature sensor 213a measures ambient air temperature. The internal air temperature sensor 213b measures internal air temperature in the internal compartment of the motor 212 where air is present. The hall current sensor 213c measures current flowing to the motor 212. The voltage sensor 213d measures the voltage of the electrical connection to the motor 212. The vibration sensor 213e measures the vibration of the body of the motor 212. The humidity sensor 213f measures the humidity of the motor 212.

The one board computer 210 may be connected to a PC 218. The connection from the one board computer 210 to the PC 218 is most likely a wireless connection enabled by a wireless module (not shown) with a built-in wireless antenna. The one board computer 210 may also be connected to a smart phone 220 or similar mobile computing device such as a tablet computer. The one board computer 210 may transfer the results of its motor failure prediction to the PC 218 and smart phone 220 so the results can be viewed on the PC 218 or smart phone 220. More specifically, the PC 218 and smart phone 220 may run an application that has functionality to at least review and analyze the results of the motor failure prediction.

A software application, commonly known as an "app," may run on the smart phone 220. The software application may be capable of displaying data measured by the sensors 213. The software application may have a graphical user interface (GUI) that is able to display the data measured by the sensors 213 in graphical form as well as numeric form. The software application may also be capable of displaying the outputs of the machine learning model to the user (e.g., thermal failure probability) in various graphical and numerical formats. At a minimum, the software application may query the database in the server 204. The software application may also able to generate messages and alerts through the smartphone's 220 interface to display any information that could be displayed within the application itself. The alert message may be generated and popped up if the thermal failure probability is larger than 80%.

Figure 3:
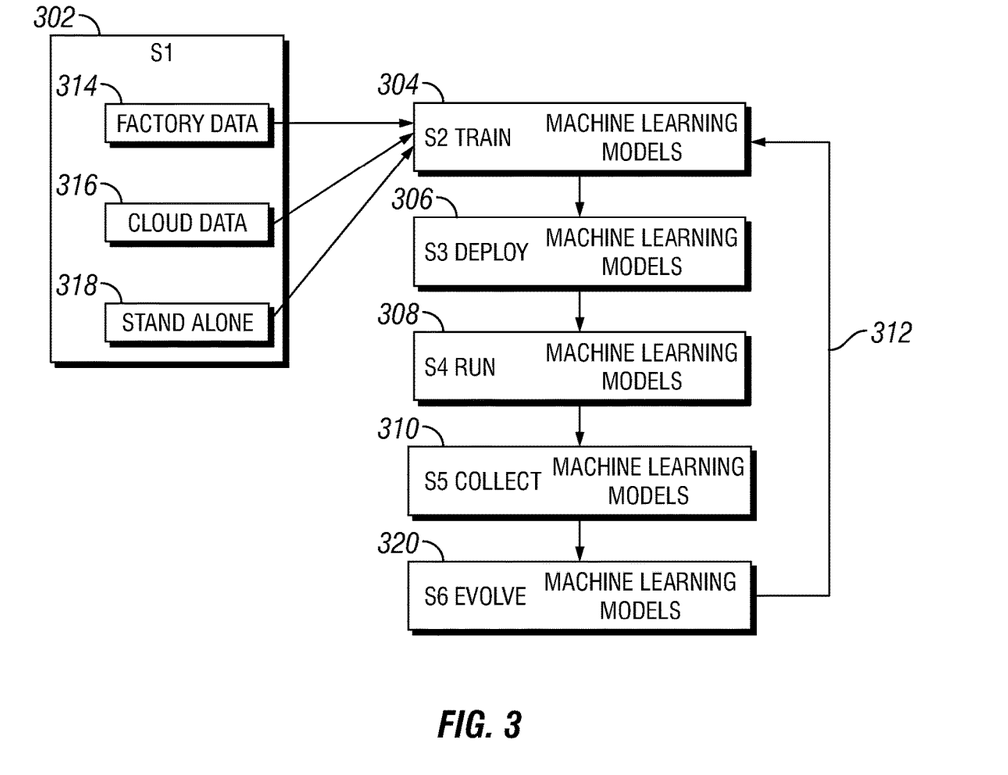
FIG. 3 is a flow chart illustrating the evolutionary machine learning model used in the system for motor failure prediction in FIG. 2.

FIG. 3. is a flow chart illustrating the evolutionary machine learning model that may be used in the system for motor failure prediction in FIG. 2. After the machine learning models 208 are deployed to the one board computer 210, the one board computer 210 may use a self-evolution algorithm to further train the machine learning models 208 using data collected and stored in the one board computer 210.

In step S1 302, a source for the original data used to train the initial machine learning models 208 may be selected. Three possible types of data for training the initial machine learning models 208 may be factory data 314, cloud data 316, and stand-alone data 318. Factory data 314 may be indicator data 203 of a motor type running in a factory similar to the one the machine learning model 208 is to predict motor failure for. The factory data 314 allows approximation of how the motor for which motor failure prediction is applied will behave. Factory data 314 may be collected by using a single new motor for one month. Cloud data 316 may be data available on the cloud which is indicator data for a motor type similar to the motor 212. Cloud data 316 is not from the actual factory or operational setting the motor is operating in. Cloud data 316 may also allow an approximation of how the motor will likely behave.

Stand-alone data 318 may be actual indicator data collected from the motor 212 to which motor failure prediction is applied.

If it is not possible to use a single new motor for one month, factory data 314 may be collected by using the operation data of the motors in service (including the new motor). That data should be viewed as a "normal mode" data which may be stacked and used to train predictive machine learning models. This is a method of creating a hybrid sourcing of indicator data by combining factory data 314 with stand-alone date 318.

In step S2 304, the set of indicator data selected may be used to train machine learning models 208 in the server 204. In step S3 306, the machine learning models 208 may be deployed to the one board computer 210. In step S4 308, the one board computer 210 may begin to run the machine learning models deployed on it to predict the probability of the failure of motor 212. In step S5 310, the one board computer 210 may collect additional indicator data using the various sensors 213 mounted on it. This is known as the in-service training step. The additional data can be collected over a pre-determined time period, such as one month. In step S6 320, the one board computer 210 may evolve the machine learning models deployed on the one board computer 210. The evolved machine learning models may be transferred 312 back to the server 204. The server 204 may then start to retrain new machines learning models and the process begins anew.

Figure 4:
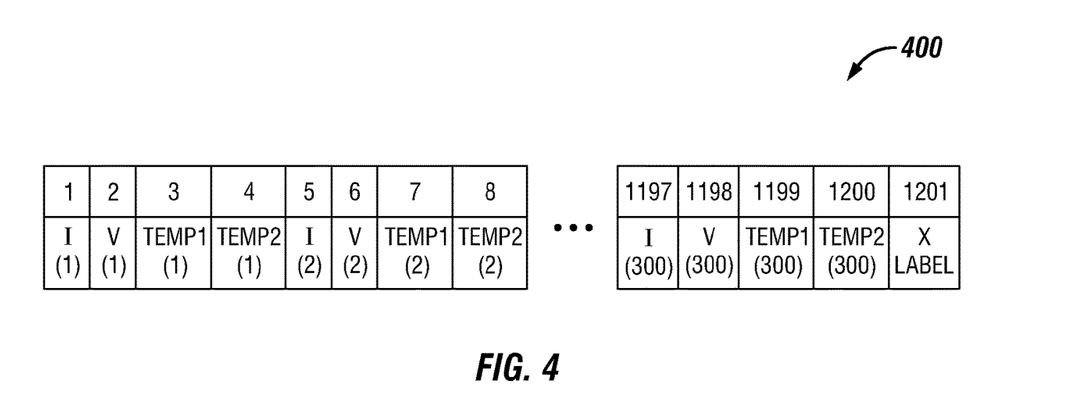
FIG. 4 is a table illustrating the arrangement and storage of collected indicator data.

FIG. 4 is a table illustrating the arrangement and storage of collected indicator data. The indicator data 203 may be formed into a training dataset for training a single predictive machine learning model. In one example, the training dataset may be indicator data 203 for the four variables of current, voltage, ambient air temperature, and internal air temperature. The training dataset, when arranged, can be visualized as a two-dimensional table 400. The single predictive machine learning model may define a time period for collection of the indicator data 203. In this example, the time period is defined as 5 minutes. The end result is that there are 1201 real numbers in a row of the table where the last number is the X_label and the first 1200 numbers are the indicator data 203 that is a state vector of a motor. In the current example, the data collection time period is set for 5 minutes and a data point is collected each second. As there are 60 seconds in every minute, a total of 300 entries are collected over a 5 minute time period. Each second, a data pointed is collected for the 4 variables of current, voltage, ambient temperature and motor internal temperature. As a result, in this example, where there are 300 data points in a 5 minute time period, a total of 1200 data points are collected owing to there being 4 variables (current, voltage, ambient air temperature, and internal air temperature) for which data points must be collected. The 1200 data points are stored as an input vector. The input vector serves as an input to the single predictive machine learning model.

Figure 5:
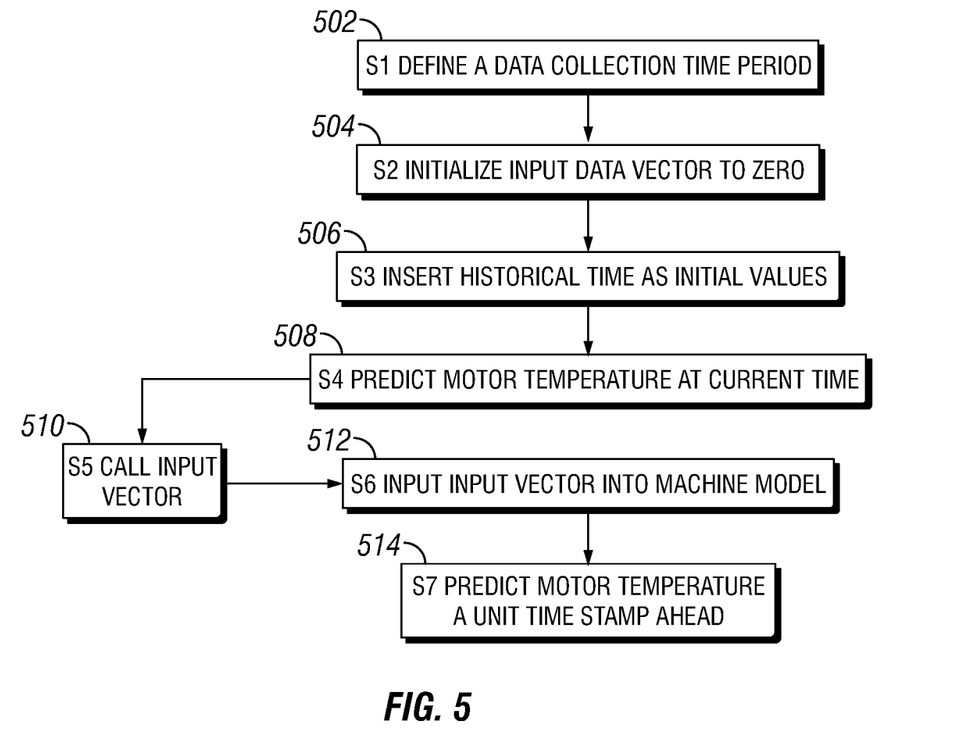
FIG. 5 is a flow chart illustrating the temperature prediction algorithm of a single predictive machine learning model.

FIG. 5 is a flow chart illustrating the temperature prediction algorithm of a single predictive machine learning model (M1) 208. The single predictive machine learning model (M1) 208 may enable the prediction of the temperature of the motor. As the basis of the overall machine learning model, the single predictive machine learning model (M1) 208 is able to learn, over time, to accurately predict temperature. In step S1 502, the single predictive machine learning model (M1) 208 defines a data collection time period. In step S2 504, the single predictive machine learning model (M1) 208, initializes the input vector for the defined initial period to zero. In step S3 506, the single predictive machine learning model (M1) 208 inserts the stored indicator values 203 as the initial values for the defined initial period. In step S4 508, the single predictive machine learning model (M1) 208, predicts the motor temperature at the current time and outputs that temperature value. In step S5 510, the single predictive machine learning model (M1) 208 calls the input vector at the current time. In step S6 512, the single predictive machine learning model (M1) 208 inputs the input vector called. In step S7 514, the single predictive machine learning model (M1) 208 predicts the motor temperature for at least a unit time stamp ahead.

The single predictive machine learning model may generate output data. In this instance, the output is a prediction of the motor internal temperature in the next second (to the present time).

Using the current example, the steps in the temperature prediction algorithm are explained. In step S1 502, the data collection time period is defined. The data collection time period in this example is defined as 5 minutes (300 seconds). Then step S2 504, the input vectors for the time stamps 1 to 299 are initialized as zero vectors:

$$\text{Input}(1) = \text{Input}(2) = \ldots = \ldots = \text{Input}(299) = \text{zero vectors}$$

As the collection of data progresses over the data collection time period, the input vector at each time stamp contains the variables for predicting motor failure and in this example they are the current, the voltage, the motor ambient temperature and motor internal temperature of all the data points before that time stamp stored as indicator values 203. In step S3 506, the stored indicator values 203 are inserted into the input vector as initial values. The input vector, at the time stamp, k, is 300, then becomes:

$$\text{Input}(300) = [I(1), V(1), \text{Temp1}(1), \text{Temp2}(1), I(2), V(2), \text{Temp1}(2), \text{Temp2}(2), \ldots I(300), V(300), \text{Temp1}(300), \text{Temp2}(300)]$$

In general, where the time stamp, k, is greater than or equal to 300, the input vector is:

$$\text{Input}(k) = [I(k-299), V(k-299), \text{Temp1}(k-299), \text{Temp2}(k-299), I(k-298), V(k-298), \text{Temp1}(k-298), \ldots I(k), V(k), \text{Temp1}(k), \text{Temp2}(k)]$$

In step S4 508, the single predictive machine learning model (M1) 208, predicts the motor temperature at the current time and outputs that temperature value. The output vector at a time stamp, k, is the predicted motor temperature at time stamp, k:

$$\text{Output}(k) = [\text{predicted motor temperature}(k)]$$

Then in step S5 510, the single predictive machine learning model (M1) 208, calls the input vector. Following this, in step S6 512, the input vector is input into the single predictive machine learning model (M1) 208. Essentially, it operates as the following function:

$$\text{Output}(k+1) = M1(\text{Input}(k))$$

In step S7 514, the single predictive machine learning model (M1) 208, predicts the motor temperature for a unit time stamp ahead of the current time stamp. In the current example, the output vector at time stamp k+1 is the input vector at time stamp k applied to the model M1. The predicted motor temperature at Timestamp=k+1 second is derived from the data from time stamp=k-299 to time stamp=k.

Figure 6:
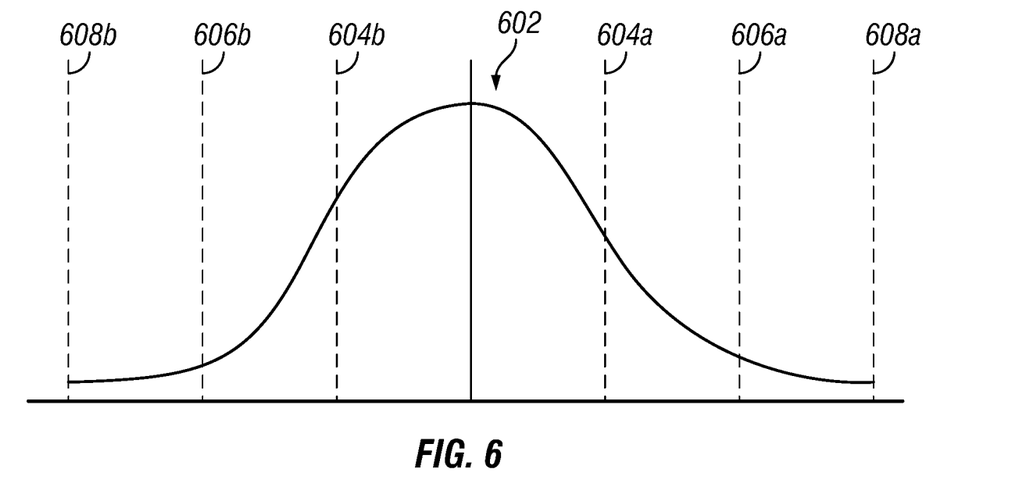
FIG. 6 illustrates temperature prediction using multiple predictive machine learning models.

FIG. 6 illustrates temperature prediction using multiple predictive machine learning models. As discussed earlier, for each time stamp=k+1, the predicted motor temperature is calculated based on the previous state vectors. A moving average for each single predictive machine learning model is calculated based on a prediction error. The prediction error at k+1 for each single predictive machine learning model is the difference between the internal motor temperature at k+1 and the output vector at (k+1). For the initial data collection time period, the prediction_error(k) is also initialized as a zero value.

prediction_error(k+1)=Temp1(k+1)−Output(k+1);
error_mv(k+1)=error_mv(k)*0.8+0.2 *prediction_error(k)*prediction_error(k)

The error_mv(k+1) is derived with the information from data where the time stamp is less than k+1. After the moving average is calculated, three pairs of upper bounds and lower bounds are calculated. The three pairs of bounds delineate a normal distribution 602 in which all output values fall. Each bound is calculated by adding and subtracting respectively the square root of the moving average multiplied by a bounding value from the output value. In one representative example, the first set of bounds, upper bound 1 604a and lower bound 1 604b are calculated by adding and subtracting respectively the square root of the moving average multiplied by one from the output value. The second set of bounds, upper bound 2 606a and lower bound 2 606b, are calculating by adding and subtracting respectively the square root of the moving average multiplied by two from the output value. The third set of bounds, upper bound 3 608a and lower bound 3 608b, are calculated by adding and subtracting respectively the square root of the moving average multiplied by three from the output value. Each bound is the prediction of the temperature at the time stamp k+1. In the representative example, the bounding values are 1, 2, and 3 respectively for each bound.

Upper_bound_1(k+1)=Output(k+1)+sqrt(error_mv(k+1))*1

Lower_bound_1(k+1)=Output(k+1)+sqrt(error_mv(k+1))*1

Upper_bound_2(k+1)=Output(k+1)+sqrt(error_mv(k+1))*2

Lower_bound_2(k+1)=Output(k+1)+sqrt(error_mv(k+1))*2

Upper_bound_3(k+1)=Output(k+1) +sqrt(error_mv(k+1))*3

Lower_bound_3(k+1)=Output(k+1)+sqrt(error_mv(k+1))*3

In summary, every second, for each single predictive machine learning model, a block of historical state vector data may be consumed to calculate the predicted temperature. A prediction error may be calculated. The prediction error may then be used to calculate a moving average. The moving average may then be used to derive three pairs of temperature bounds. In total, with a single predictive machine learning model, the following variables are calculated for each second:

Output(k+1), Lower_bound_1(k+1), Lower_bound_2(k+1), Lower_bound_3(k+1), Upper_bound_1(k+1), Upper+bound_2(k+1) Upper_bound_3(k+1)

As discussed above, if it is possible to collect factory data 314 for each motor, the single board computers may collect the data and store the data as a state vector (ambient air temperature variable 502a, motor internal temperature variable 502b, current variable 502c, and voltage variable 502d) and upload the data to the server 204. In one example the data collection period may be one month. When it is not possible to collect factory data 314, stand-alone data 318 may be collected from the field. Stand-alone data 318 may be collected by the one board computer 210 and uploaded to the server 204. Where factory data 314 is used to initially train the predictive machine learning models, all the training datasets from different motors may be stacked and consumed into one model. By stacking and consuming datasets from different motors, a uniform model for different motors can be generated. In the case of training the predictive machine learning model based on the stand-alone data 318 gathered from the field, we may use the training dataset from each motor separately since field conditions can be very different. Thus, the single predictive machine learning models may be different for different motors.

Figure 7:
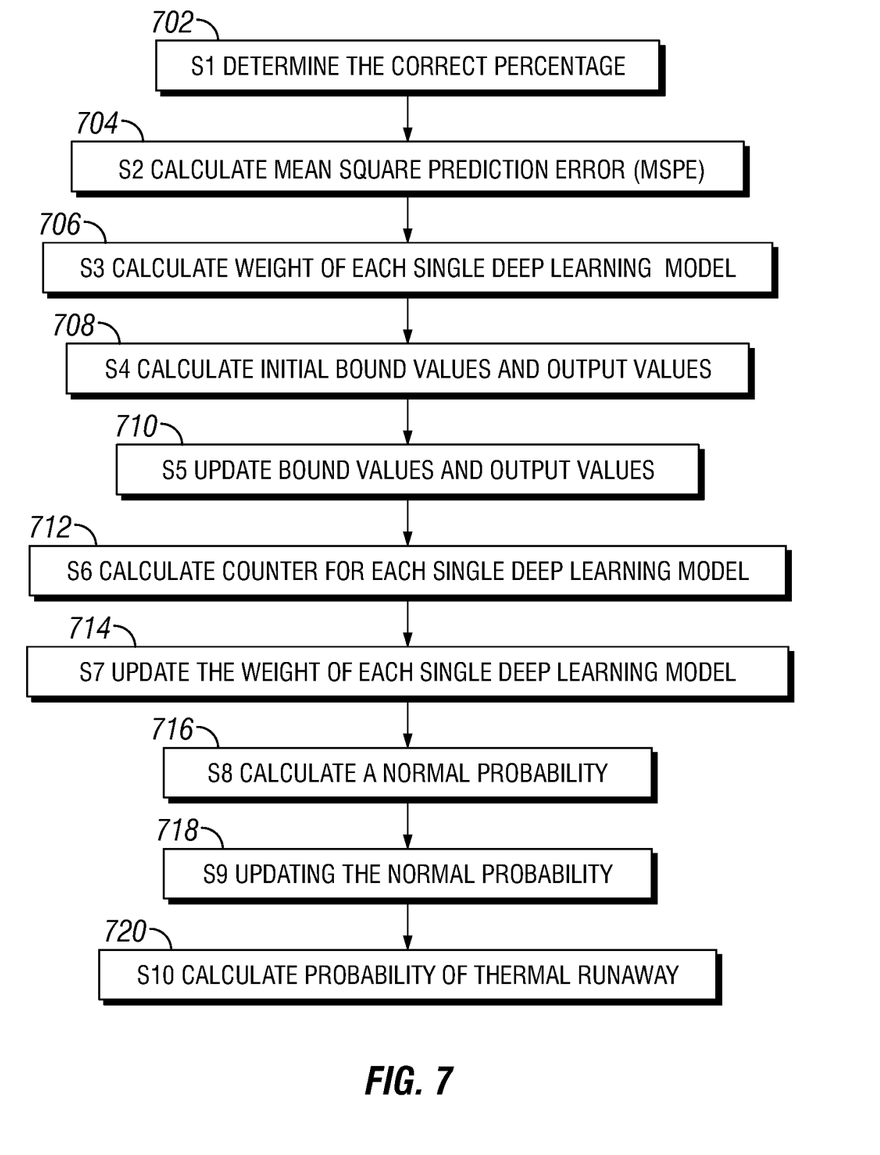
FIG. 7 is a flow chart illustrating the algorithm for evolving multiple predictive machine learning models through data shuffling.

FIG. 7 is a flow chart for illustrating the algorithm for evolving multiple machine learning models through data shuffling. In step S1 702, a correct percentage is determined. The correct percentage is used to remove from the training dataset input values that are correct. The input values that are removed are randomly selected. In a representative example, the correct percentage is 80%. In step S2 704, the input values that are not removed are used to calculate a mean square prediction error (MSPE). Continuing the representative example, the input values that are not removed are 20% of the input values. In step S3 706, a weight of each single predictive machine learning model as a part of the multiple predictive machine learning model is calculated. The weight is the weighted average contribution of each single predictive machine learning model to the total multiple predictive machine learning model. In the representative example where there are three single predictive machine learning models, the weights are designated weight 1 (w1), weight 2 (w2), and weight 3 (w3). Each weight is calculated by the inverse MSPE value of each single predictive machine learning model divided by the sum of the inverse MSPE values of all the single predictive machine learning models that make up the multiple predictive machine learning model.

total inverse MSPE=(1/MSPE1)+(1/MSPE2)+(1/MSPE3)

weight1=(1/MSPE1)/total inverse MSPE weight2=(1IIMSPE2)/total inverse MSPE weight3=(1MSPE3)/total inverse MSPE In evolving multiple predictive machine learning models, the weights of each single predictive machine learning model may be updated in every time stamp period. Those models had weights w1, w2 and w3. As discussed earlier, each single predictive machine learning model initially calculates the following bounds every second: Lower_bound_1(k+1), Lower_bound_2(k+1), Lower_bound_3(k+1), Upper_bound_1(k+1), Upper_bound_2(k+1), Upper_bound_3(k+1).

In step S4 708, the initial bound values and output values are calculated. Then every second, three total values that are each the aggregate values of the three single predictive machine learning models are calculated—a total_Lower_bound, a total_Upper_bound, and a total_Output. The contribution of each single predictive machine learning model is defined by the weights calculated earlier. The equations for calculating a total_Lower_bound, a total_Upper_bound, and a total_Output are specified as follows:

total_Lower_bound($k$+1)=$w$1/($w$1+$w$2+
$w$3)*$M$1_Lower_bound_3($k$+1)+$w$2/($w$1+
$w$2+$w$3)*$M$2_Lower_bound_3($k$+1)+$w$3/($w$1+
$w$2+$w$3)*$M$3_Lower_bound_1($k$+1)

total_Upperbound($k$+1)=$w$1/($w$1+$w$2+
$w$3)*$M$1_Upper_bound_3($k$+1)+$w$2/($w$1+
$w$2+$w$3)*$M$2_Upper_bound_3($k$+1)+$w$3/($w$1+
$w$2+$w$3)*$M$3_Upper_bound_1($k$+1)

total_Output($k$+1)=$w$1/($w$1+$w$2+$w$3)*$M$1_Output($k$+
1)+$w$2/($w$1+$w$2+$w$3)*$M$2_Output($k$+1)+$w$3/($w$1+
$w$2+$w$3)*$M$3_Output($k$+1)

In step S5 710, the bound values and output values are updated every time stamp period.

In step S6 712, the counter for each single machine learning model may be calculated. The weights of each single predictive machine learning model may be updated every time stamp period. In the representative example, the weights are updated every second. A counter may be maintained for each single predictive machine learning model. The initial values of the counters are set to zero. For each single predictive machine learning model, every time stamp period, the range in which the output value falls may be evaluated. Continuing the example of three single predictive machine learning models (M1, M2, and M3) clustered to form a multiple predictive machine learning model and where each single predictive machine learning model has its own counter (c1, c2, and c3), the counters used to keep track of the ranges in which a output value falls.

Every time stamp period, if the measured internal motor temperature lies in the range of [M1_Lowerbound_2(k+1), M1_Lower_bound_1(k+1)] or in the range of [M1_Upper_bound_2(k+1),M1_Upper_bound_1(k+1)], c1 is increased by 1. If the measured internal motor temperature lies in the range of [M2_Lower_bound_2(k+1), M2_Lower_bound_1(k+1)] or in the range of [M2_Upper_bound_2(k+1),M2_Upper_bound_1(k+1)], c2 is increased by 1, If the measured internal motor temperature lies in the range of [M3_Lowerbound_2(k+1), M3_Lower_bound_1(k+1)] or in the range of [M3_Upper_bound_2(k+1),M3_Upper_bound_1(k+1)], c3 is increased by 1.

In step S7 714, the weights of each single predictive machine learning model are updated. At the end of each time stamp period, the weights may be updated. In order to update the weights, a total inverse counter, which is the sum of the reciprocal of each counter, may be calculated. The weight in the next time stamp period is calculated by adding to the weight in the current time stamp period the reciprocal value of the counter value divided by the total inverse counter multiplied by one percent.

total inverse counter=1/$c$1+1/$c$2+1/$c$3

$w$1($k$+1)=$w$1($k$)*0.99+(1/$c$1/total inverse counter)*0.01

$w$2($k$+1)=$w$2($k$)*0.99+(1/$c$2/total inverse counter)*0.01

$w$3($k$+1)=$w$3($k$)*0.99+(1/$c$3/total inverse counter)*0.01

FIG. 7 also illustrates the prediction of abnormal temperature events in the form of a thermal runaway probability. Using the upper bound 3 608*a* and lower bound 3 608*b* calculated earlier for each single predictive machine learning model and the weights of each single predictive machine learning model, a total upper bound value and a lower upper bound value may be calculated. Again, in the representative example of three single predictive machine learning models formed as a multiple predictive machine learning model, aggregate total upper bound and lower upper bound values are calculated as follows:

total_Lower_bound($k$+1)=$w$1/($w$1+
$w$2+$w$3)*$M$1_Lower_bound_3($k$+1)+$w$2/($w$1+
$w$2+$w$3)*$M$2_Lower_bound_3($k$+1)+$w$3/($w$1+
$w$2+$w$3)*$M$3_Lower_bound_1($k$+1)

total_Upper_bound($k$+1)=$w$1/($w$1+$w$2+$w$3)*
$M$1 _Upper_bound_3($k$+1)+$w$2/($w$1+
$w$2+$w$3)*$M$2_Upper_bound_3($k$+1)+$w$3/($w$1+
$w$2+$w$3)*$M$3_Upper_bound_1($k$+1)

In step S8 716, a normal probability is calculated. After the total upper bound and lower upper bound values are calculated, the normal probability, r, is updated. Initially, at time zero (i.e., k=0), the normal probability is set to 1. The normal probability in the next time stamp period r(k+1) can then be calculated by applying a binary rule. In step S9 718, the normal probability is updated. The binary rule is that where the measured internal motor temperature lies in the range between the total upper bound and lower upper bound values, the normal probability, r, in the k+1 time stamp period remains the same as the normal probability, r, in the current time period. Where the measured internal motor temperature does not lie in the range between the total upper bound and lower upper bound values, the normal probability, r, in the k+1 time stamp period is the normal probability. r, in the current period, reduced by a discount factor. In the representative example, the discount factor is 98%. Finally, in step S10 720, a thermal runaway probability, p, is calculated as the normal probability r(k+1) subtracted from 1. In the representative example of three single predictive machine learning models formed as a multiple predictive machine learning model:

$r$(0)=1

If the measured motor temperature lies in the range
of [total_Lower_bound, total_Upper_bound],
then $r$($k$+1)=$r$($k$);

If the measured motor temperature does NOT lie in
the range of [total_Lower_bound, total_
Upper_bound], then $r$($k$+1)=$r$($k$)*98%;

$p$($k$+1)=1−$r$($k$)

Unless otherwise specifically stated, the terms and expressions have been used herein as terms of description and not terms of limitation. There is no intention to use the terms or expressions to exclude any equivalent of features shown and described or portions thereof and this invention should be defined in accordance with the claims that follow.

What is claimed is:

1. A non-transitory computer-readable medium with instructions stored thereon, wherein the medium is configured to predict a behavior of a motor, that when executed by a processor, performs the steps comprising: determining a plurality of predictive machine learning models; receiving input values from at least one sensor, said at least one sensor is configured to receive operational data from the motor; updating a probability of a plurality of operational outcome of the motor for each of a unit time stamp within a predetermined time period, comprising: calculating a percentage of input values that are correct; removing, at random, a plurality of input values corresponding to the percentage that are incorrect; calculating a mean square prediction error value from the input values not removed; calculating a weight of each of the plurality of predictive machine learning models; determining an upper bound and a lower bound of the input values not removed; calculating a counter value for each of the plurality of predictive machine learning models; updating the weight of each of the plurality of predictive machine learning models; calculating a normal probability; updating the upper bound and lower bound of the input values not removed; updating the normal probability based on the updated upper bound and updated lower bound of the input values not removed; calculating the probability of a plurality of operational outcomes of the motor; predicting the behavior of the motor for said unit time stamp; and transferring data respecting the predicted behavior of the motor to at least one of a personal computer (PC) and a smart phone.

2. The non-transitory computer-readable medium of claim 1, wherein calculating the weight comprises calculation of the weighted average contribution of each of the plurality of predictive machine learning models to a total of the plurality of predictive machine learning model.

3. The non-transitory computer-readable medium of claim 2, wherein updating the weight of each of the plurality of predictive machine learning models comprises updating said weight in every time stamp period.

4. The non-transitory computer-readable medium of claim 1, wherein the method is used to predict thermal runaway.

5. The non-transitory computer-readable medium of claim 1, wherein the method is used to generate a range of temperature range predictions.

6. The non-transitory computer-readable medium of claim 1, wherein the processor generates an urgent alert signal if thermal runaway is predicted.

7. A system comprising: a non-transitory computer-readable medium with instructions encoded thereon, wherein the medium is configured to predict a behavior of a motor; and one or more processors configured to, when executing the instructions, perform operations of: determining a plurality of predictive machine learning models; receiving input values from at least one sensor, said at least one sensor is configured to receive operational data from the motor; updating a probability of a plurality of operational outcome of the motor for each of a unit time stamp within a predetermined time period, comprising: calculating a percentage of input values that are correct; removing, at random, a plurality of input values corresponding to the percentage that are incorrect; calculating a mean square prediction error value from the input values not removed; calculating a weight of each of the plurality of predictive machine learning models; determining an upper bound and a lower bound of the input values not removed; calculating a counter value for each of the plurality of predictive machine learning models; updating the weight of each of the plurality of predictive machine learning models; calculating a normal probability; updating the upper bound and lower bound of the input values not removed; updating the normal probability based on the updated upper bound and updated lower bound of the input values not removed; calculating the probability of a plurality of operational outcomes of the motor; predicting the behavior of the motor for said unit time stamp; and transferring data respecting the predicted behavior of the motor to at least one of a personal computer (PC) and a smart phone.

8. The system of claim 7, wherein calculating the weight comprises calculation of the weighted average contribution of each of the plurality of predictive machine learning models to a total of the plurality of predictive machine learning model.

9. The system of claim 7, wherein updating the weight of each of the plurality of predictive machine learning models comprises updating said weight in every time stamp period.

10. The system of claim 7, wherein the method is used to predict thermal runaway.

11. The system of claim 7, wherein the method is used to generate a range of temperature range predictions.

12. The system of claim 7, wherein the processor generates an urgent alert signal if thermal runaway is predicted.

* * * * *